US012127996B2

(12) United States Patent
Younger

(10) Patent No.: US 12,127,996 B2
(45) Date of Patent: Oct. 29, 2024

(54) KNEE CRUTCH

(71) Applicant: Medical Depot, Inc., Port Washington, NY (US)

(72) Inventor: Max Jefferies Younger, Roeland Park, KS (US)

(73) Assignee: Medical Depot, Inc., Port Washington, NY (US)

(*) Notice: Subject to any disclaimer, the term of this patent is extended or adjusted under 35 U.S.C. 154(b) by 188 days.

(21) Appl. No.: 18/063,558

(22) Filed: Dec. 8, 2022

(65) Prior Publication Data

US 2023/0172789 A1 Jun. 8, 2023

Related U.S. Application Data

(60) Provisional application No. 63/265,143, filed on Dec. 8, 2021.

(51) Int. Cl.
*A61H 3/00* (2006.01)
*A61H 3/02* (2006.01)

(52) U.S. Cl.
CPC ......... *A61H 3/02* (2013.01); *A61H 2003/005* (2013.01)

(58) Field of Classification Search
CPC ................ A61H 3/02; A61H 2003/005; A61H 2003/007; A61H 2201/0192; A61F 5/0106; A61F 5/0113
USPC ............................ 135/68, 69; 602/26, 32, 39
See application file for complete search history.

(56) References Cited

U.S. PATENT DOCUMENTS

| | | | | |
|---|---|---|---|---|
| 2,990,745 A * | 7/1961 | Casavant | G10G 5/005 84/421 |
| D291,148 S * | 8/1987 | Rizzo | D3/7 |
| 5,300,016 A * | 4/1994 | Marlatt | A61F 5/0195 623/32 |
| 5,941,263 A * | 8/1999 | Bierman | A61H 3/02 135/69 |
| 6,494,919 B1 * | 12/2002 | Matthews | A61H 3/02 623/32 |
| 6,799,592 B1 * | 10/2004 | Reynolds | A45B 9/00 135/74 |
| 8,778,031 B1 * | 7/2014 | Latour, Jr. | A61F 5/0102 135/65 |
| 9,408,443 B2 | 8/2016 | Hunter | |
| 10,182,935 B2 * | 1/2019 | Sigurdsson | A61F 5/0102 |
| 10,512,305 B2 * | 12/2019 | Omarsson | A61F 5/01 |
| 10,624,810 B2 | 4/2020 | Hunter | |

(Continued)

FOREIGN PATENT DOCUMENTS

| | | |
|---|---|---|
| KR | 101882782 B1 | 7/2018 |
| WO | 0124758 A1 | 4/2001 |

OTHER PUBLICATIONS

International Search Report and Written Opinion dated Apr. 18, 2023, 12 pages, issued in PCT Application No. PCT/US2022/081196.

*Primary Examiner* — Robert Canfield
(74) *Attorney, Agent, or Firm* — Bradley J. Shelowitz

(57) ABSTRACT

A knee crutch includes a leg tube; a support tube secured to the leg tube and comprising a platform portion and a vertical portion; a cradle positioned atop and secured to the platform portion of the support tube; and a thigh restraint coupled to the vertical portion of the support tube. The thigh restraint has a pair of wings operably coupled to an adjustment mechanism. The adjustment mechanism is configured to simultaneously and dependently adjust an angular position of the pair of wings.

20 Claims, 6 Drawing Sheets

(56) References Cited

U.S. PATENT DOCUMENTS

| | | | | |
|---|---|---|---|---|
| 11,896,504 | B2 * | 2/2024 | Wellman | A61F 2/7812 |
| 2008/0109947 | A1 * | 5/2008 | Dubois | A42B 3/145 2/414 |
| 2009/0030353 | A1 * | 1/2009 | Bonutti | A61H 1/0274 601/5 |
| 2009/0165834 | A1 * | 7/2009 | West | A61H 3/02 135/65 |
| 2011/0178446 | A1 * | 7/2011 | Benenati | A61F 3/00 601/34 |
| 2013/0152986 | A1 * | 6/2013 | Hunter | A61H 3/0288 135/66 |
| 2013/0226058 | A1 * | 8/2013 | Sanders | A61H 3/0277 602/23 |
| 2016/0120730 | A1 | 5/2016 | Guerre-Chaley | |
| 2016/0151224 | A1 | 6/2016 | Ferro et al. | |
| 2020/0222267 | A1 * | 7/2020 | Hunter | A61H 3/02 |
| 2021/0393428 | A1 * | 12/2021 | Faux | A43B 7/20 |

* cited by examiner

KNEE CRUTCH

CROSS-REFERENCE TO RELATED APPLICATIONS

This application claims the benefit of priority of U.S. Provisional Patent Application No. 63/265,143, titled Knee Crutch, filed Dec. 8, 2021, the disclosure of which is incorporated by reference herein in its entirety.

FIELD OF THE INVENTION

The disclosure relates generally to the field of mobility devices. More specifically, the disclosure relates to knee crutches.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere herein.

According to one embodiment, a knee crutch includes a leg tube; a support tube secured to the leg tube and comprising a platform portion and a vertical portion; a cradle positioned atop and secured to the platform portion of the support tube; and a thigh restraint coupled to the vertical portion of the support tube. The thigh restraint has a pair of wings operably coupled to an adjustment mechanism. The adjustment mechanism is configured to simultaneously and dependently adjust an angular position of the pair of wings.

According to another embodiment, a knee crutch includes a frame, a cradle, and a thigh restraint. The frame includes a leg tube comprising a foot; and a support tube coupled to the leg tube, the support tube comprising a generally horizontal platform portion and a generally vertical portion. The cradle is positioned atop and secured to the platform portion of the support tube substantially along a length of the platform portion. The thigh restraint is coupled to the vertical portion of the support tube. The thigh restraint has a brace; an adjustment mechanism coupled to the brace; a first wing, and a second wing. The first wing has a first end and a second end. The first end is rotatably coupled to the brace. The first wing further includes a first extension member comprising a proximal and a distal end. The proximal end of the first extension member is rotatably coupled to the first wing via a bracket, and the distal end of the first extension member being in operable communication with the adjustment mechanism. The second wing includes a first end and a second end. The first end is rotatably coupled to the brace. The second wing further includes a second extension member comprising a proximal and a distal end. The proximal end of the second extension member is rotatably coupled to the second wing via a bracket. The distal end of the second extension member is in operable communication with the adjustment mechanism. A strap extends between the respective second ends of the first and second wings. The strap is secured to one of the respective second ends of the first and second wings and selectively temporarily coupled to the other of the respective second ends of the first and second wings. Actuating the adjustment mechanism simultaneously and dependently adjusts an angular position each of the first and second wings.

In still another embodiment, a knee crutch includes a frame; a cradle supported by the frame; and a thigh restraint coupled to frame. The thigh restraint has a pair of wings operably coupled to an adjustment mechanism. Actuating the adjustment mechanism in a first direction causes the wings to simultaneously and dependently move toward one another, and actuating the adjustment mechanism in a second direction causes the wings to simultaneously and dependently move away from one another.

DETAILED DESCRIPTION

Figure 1A:
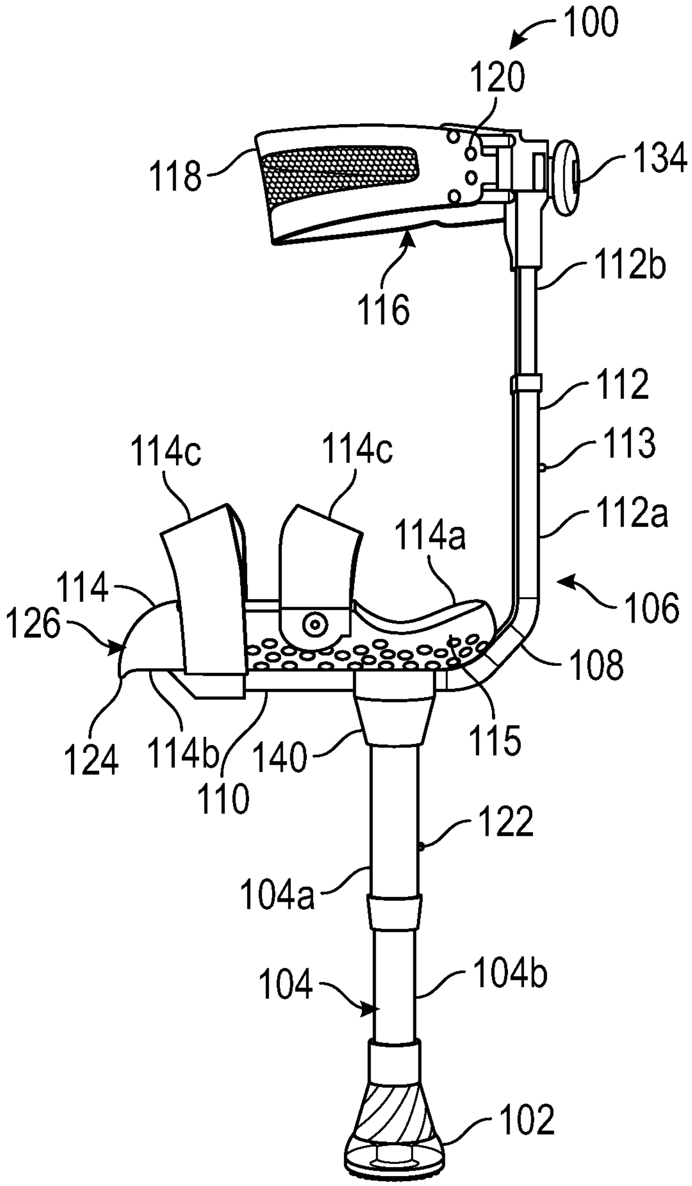
FIG. 1A is a side view of a knee crutch according to an embodiment of the invention.
Figure 1B:
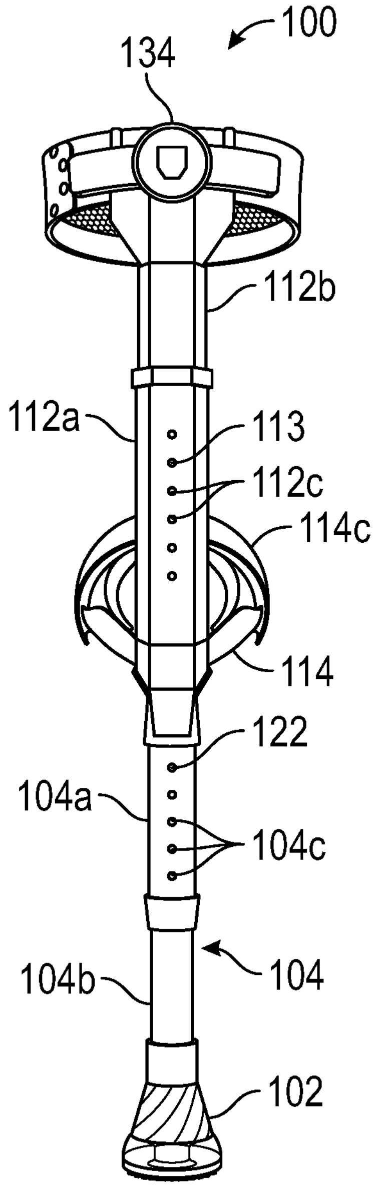
FIG. 1B is a front view of the knee crutch of FIG. 1A.

Knee crutches are generally known in the art, and are an alternative to traditional axillary crutches and/or forearm crutches. Sometimes, it is more convenient or comfortable for a user to utilize a knee crutch rather than an axillary or forearm crutch, especially where the injury is to the lower part of the user's leg, ankle, or foot. Traditional knee crutches are often difficult to operate, and it would therefore be useful to have a knee crutch that is comfortable and easy to operate for the user.

Embodiments of knee crutches are described herein with reference to the figures. The crutch 100 generally includes an adjustable leg tube 104 that extends generally vertically upwardly from a foot 102. A support tube 106 is supported on the adjustable leg tube 104 and includes a bend 108 defining a platform portion 110 and a generally vertical portion 112 that extends upwardly to the user's thigh. A shin support 114 sits atop the platform portion 110, and a thigh restraint 116, which includes a support strap 118 and brace 120, is attached to the generally vertical portion 112 to maintain the user's thigh in position.

The adjustable leg tube 104 may include a first segment 104*a* and a second segment 104*b*. The first segment 104*a* may include a plurality of vertically oriented openings 104*c* configured to engage with, e.g., a snap button 122 located on the second segment 104*b*. The second segment 104*b* may thus be raised and lowered and locked into a desired position by engaging the snap button 122 in one of the openings 104*c*. Adjusting the height of the crutch 100 via the snap button 122 changes the vertical position of the shin support 114 relative to the ground. For a shorter person, the crutch 100 may be adjusted such that the shin support 114 is closer to the ground. Conversely, for a taller person, the crutch 100 may be adjusted such that the shin support 114 is further from the ground.

Figure 1C:
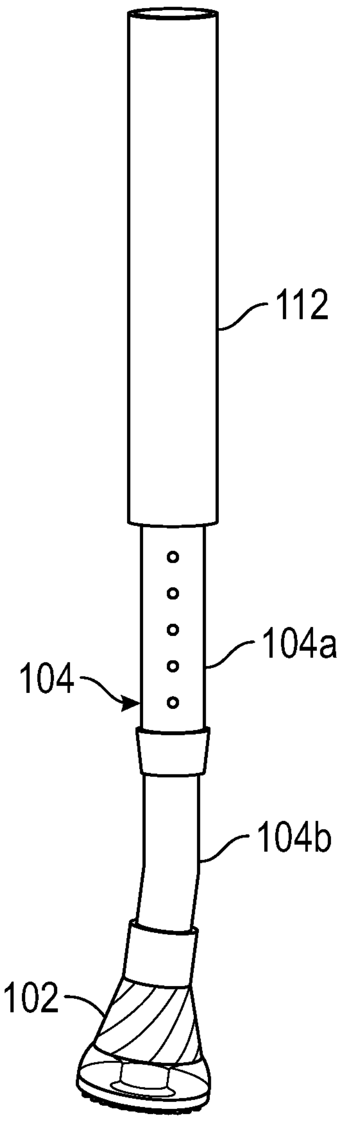
FIG. 1C is a front view of a portion of a knee crutch showing an angled lower leg section according to an embodiment of the invention.
Figure 1D:
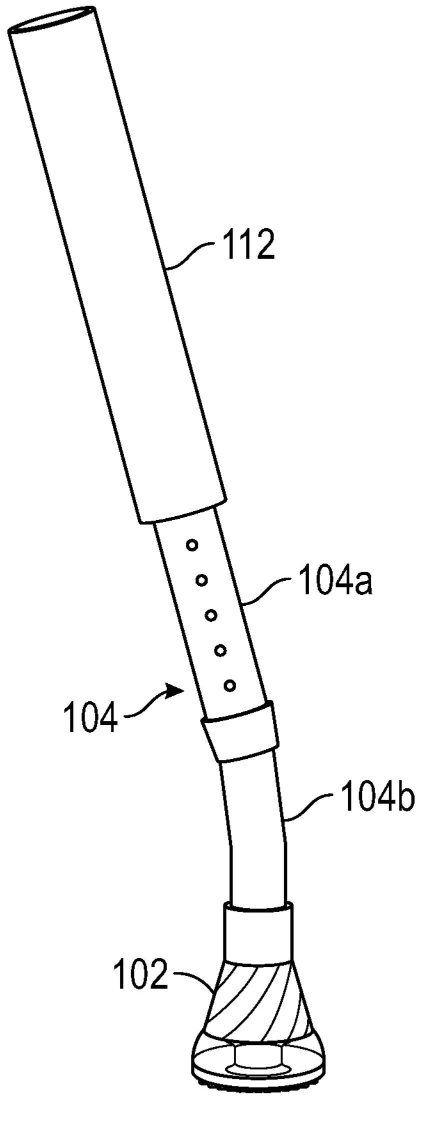
FIG. 1D is another front view the portion of the knee crutch of FIG. 1C shown in a use configuration wherein the foot contacts the ground and the crutch is angled relative to a user.
Figure 2:
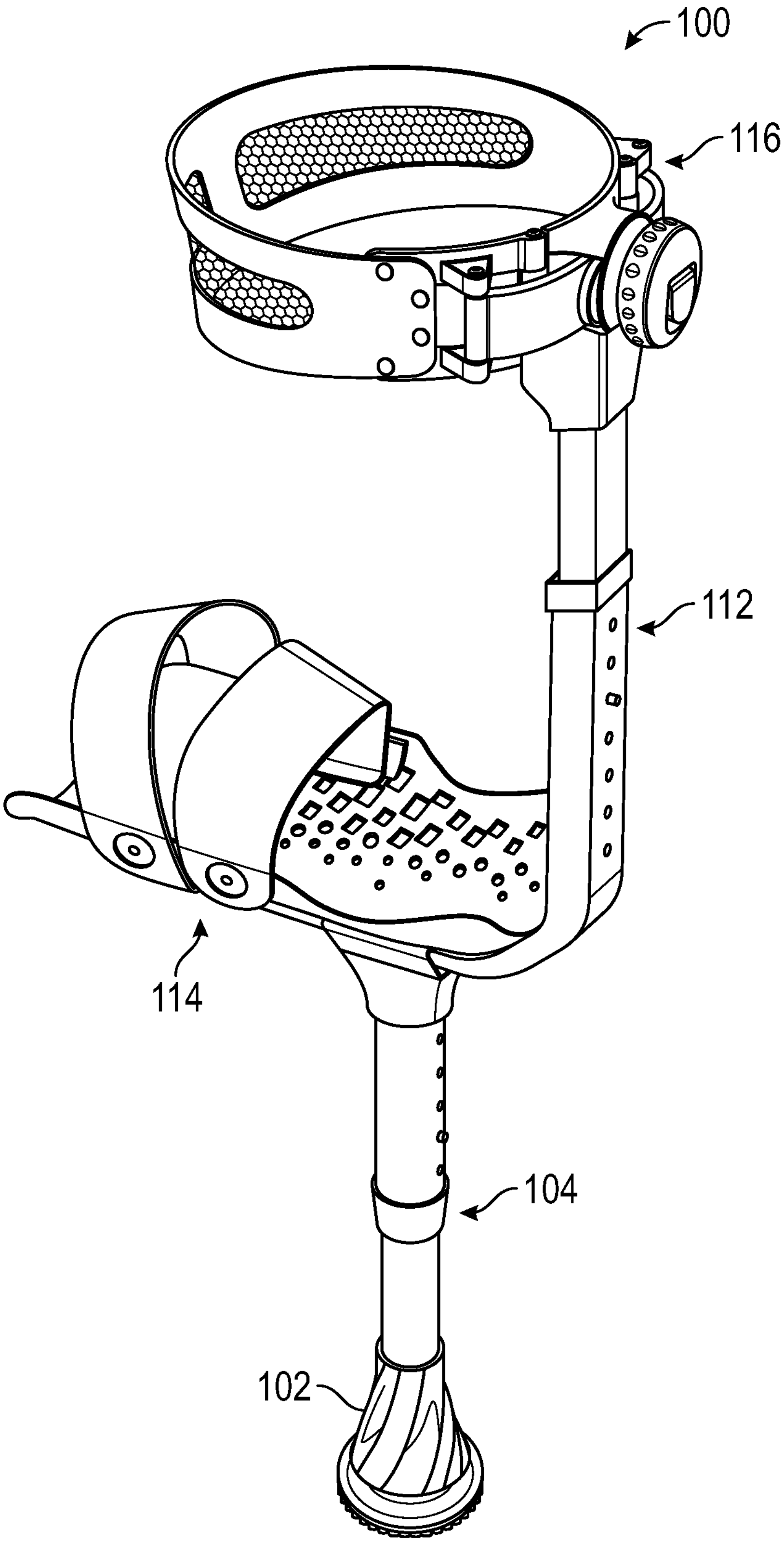
FIG. 2 is a perspective view of the knee crutch of FIGS. 1A and 1B.

As shown in FIG. 1C, the adjustable leg tube 104 may be slightly bent, e.g., in a lower segment 104*b*, which may allow the foot 102 to be slightly angled when the crutch 100 is in a substantially vertical orientation. In use, as shown in FIG. 1D, for the foot 102 to contact the ground as intended the crutch 100 is angled slightly outwardly from the user's body which may provide additional stability to the user (e.g., as when standing with legs spread apart). To accommodate the angled adjustable leg tube 104, the snap button 122 may be located on the front and/or the back of the adjustable leg tube 104 such that the lower segment 104*b* can be selectively rotated thereby allowing for specific use on either the right side or the left side of the user's body. If the snap button 122 is engaged at the front of the adjustable leg tube 104 then the foot 102 may be angled for use with the left leg, and if the snap button 122 is engaged at the back of the adjustable leg tube 104 then the foot 102 may be angled for use with the right leg (or vice versa).

The foot 102, which is attached to the end of the adjustable leg tube 104, may be a cushion-type foot, such as the foot described in U.S. patent application Ser. No. 17/448,785, which is incorporated herein by reference in its entirety. Of course, the foot 102 can be any appropriate foot whether now known or later developed.

As noted above, the support tube 106 has a bend 108 that defines the platform portion 110 of the support tube 106 and the vertical portion 112 of the support tube 106. The platform portion 110 of the support tube 106 supports a shin cradle 114. In embodiments, the shin cradle 114 may be removably attached to the platform portion 110 of the support tube 106. Generally speaking, the shin cradle 114 may have a knee end 114*a* and a foot end 114*b*. The knee end 114*a* may be generally configured to comfortably receive the user's knee, e.g., within a cup region 115 defined at the knee end 114*a*. The foot end 114*b* of the shin cradle 114 may have a rolled lip edge 124 that extends away from an inner surface 126 of the cradle 114 to allow for movement of the user's shin without the cradle 114 digging into the skin. In embodiments, the shin cradle 114 may include one or more sections that allow the shin cradle 114 to selectively expand and contract according to the length of the user's shin. The support tube 106 may also be extendable, e.g., in the platform portion 110, to provide the necessary support for the extended-length shin cradle 114.

The shin cradle 114 may be at least partially covered in a cover or pad for additional comfort and support. In embodiments, the cover may be a selectively inflatable air bladder. The pad or air bladder may be selectively positioned and/or inflated in certain regions. For example, if a user has a cast on his or her shin but the cast does not extend to the user's knee, then a gap may be created between the user's leg and the shin cradle 114 thus leaving that portion of the user's leg unsupported. The bladder may be inflated in the region of the user's leg without the cast to provide support.

As mentioned above, the shin cradle 114 may be extendable in length. Accordingly, the bladder, when used as a cover, may include one or more sections to allow the cradle 114 to extend. And in embodiments where the bladder includes multiple sections, one or more of the sections may be adjustable such that the overall length of the bladder is selectively expandable to cover the entire length of the shin cradle 114. It may also be possible to adjust the length such that the bladder generally corresponds to the length of a gap, e.g., between the top of the cast and the knee support region 114*a* of the crutch cradle 114. The bladder may be selectively adhered to the shin cradle 114, e.g., via Velcro®, adhesive, or other mechanical-type fastener.

In embodiments, a foam pad may be utilized as a cover for the shin cradle 114. The foam pad may be a single piece of material that simply covers the shin cradle 114. In an embodiment, the foam pad may include one or more pieces of foam which can be selectively adhered to the shin cradle 114. As mentioned above, the user may have, e.g., a cast on his or her leg which, due to the thickness of the cast, would result in a portion of the user's leg being unsupported. Accordingly, layers of pad may be removably adhered in a desired region to provide necessary support. In some embodiments, one or more foam pads and air bladder(s) may be utilized in combination.

The shin cradle 114 may have holes, which may reduce the weight of the cradle and increase airflow and breathability. The foam pad and/or the air bladder, where used, may optionally include corresponding air holes.

One or more straps or bands 114*c* may extend over the shin cradle 114, and the back of a user's calf, to maintain the user's leg in the shin cradle 114. The straps 114*c* may be secured to one or both sides of the cradle 114. Preferably, the straps 114*c* are made of a flexible material that allows the user to easily pull his or her leg out of the cradle 114 when desired, but is strong enough that the user's leg does not inadvertently dissociate from the cradle 114, especially when walking. In an embodiment, the straps 114*c* are made of a rigid material and are hingedly secured to one or more sides of the cradle 114 to allow the user to pull his or her leg out of the cradle 114. In one example, the straps 114*c* may lock into a closed position and be released via a button or other mechanical means. The position of the straps 114*c* may be selectively adjustable along the length of the cradle 114.

A knee strap may additionally be provided to extend around the back of a user's knee, or just slightly above the knee. The knee strap may keep the user's leg generally adjacent the support tube 106, and more specifically, may keep the user's knee within the cup region 115, thus preventing the user's leg from unintentionally sliding back on the cradle 114.

Moving up the crutch 100, the vertical portion 112 of the support tube 106 extends upwardly from the platform portion 110, and more specifically from the bend 108. The vertical portion 112 may be extendable, and therefore may include a first segment 112*a* and a second segment 112*b*. The first segment 112*a* may include a plurality of vertically oriented openings 112*c* configured to engage with, e.g., a detent 113 located on the second segment 112*b*. The second segment 112*b* may thus be raised and lowered and locked into a desired position by engaging the detent 113 in one of the openings 112*c*.

Figure 5C:
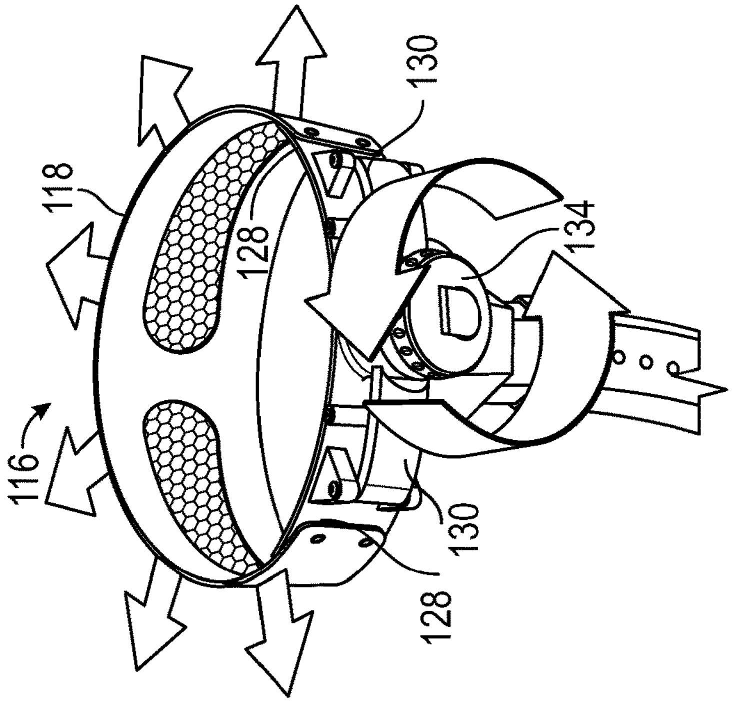
FIGS. 5A, 5B, and 5C illustrate various positions of the adjustable thigh strap as shown in FIG. 4.
Figure 5B:
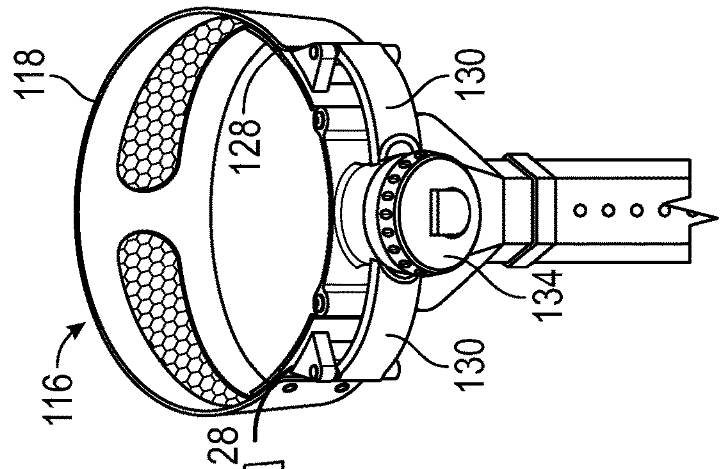
Figure 5A:
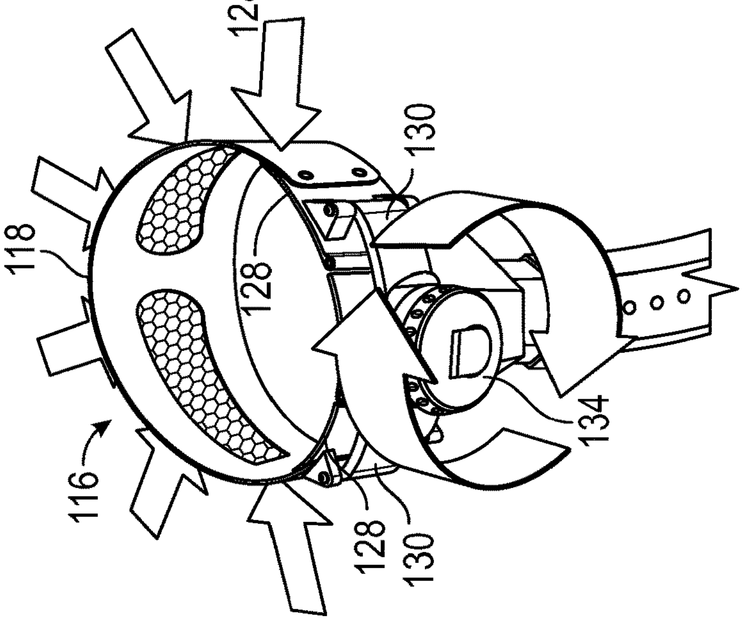

The thigh restraint 116 is positioned on the vertical portion 112 of the support tube 106. With specific reference to FIGS. 4 and 5A-C, the brace 120 of the thigh restraint 116 includes adjustable wings 128 extending from a central area 127. The wings 128 may be rotatable relative to the central area 127 about a joint 129 (e.g., a pin). Each wing 128 may include an extension member 130 that is in operable engagement with the wing 128 (e.g., via a bracket 131 and a pin 132) and an adjustment mechanism 134. The adjustment mechanism 134 is configured to simultaneously interact with each of the extension members 130 to control the angular positions of the wings 128. More specifically, respective distal ends of the extension members 130 are operably connected to the adjustment mechanism 134, which is configured to operate in a first instance to pull the distal end of each of the extension members 130 toward the central area 127 and in a second instance to push the distal end of each of the extension members 130 away from the central area 127. In the first instance, when the distal end of each of the extension members 130 is pulled toward the central area 127 via the adjustment mechanism 134, such movement of each respective extension member 130 causes the respective wing 128 to rotate outwardly about the respective joint 129 thereby increasing a distance between respective ends of the wings 128 to accommodate a user with a larger thigh (FIG. 5C). Conversely, in the second instance, when the distal end of each of the extension members 130 is pushed away from the central area 127 via the adjustment mechanism 134, such movement of each respective extension member 130 causes the respective wing 128 to rotate inwardly about the respective joint 129 thereby decreasing a distance between respective ends of the wings 128 to accommodate a user with a smaller thigh (FIG. 5A).

The adjustment mechanism 134 may therefore simultaneously adjust both wings 128 with a single engagement by the user. The adjustment mechanism 134 and the extension members 130 may together be configured as a rack-and-pinion design, where each extension member 130 acts as a rack arm that communicates with the adjustment mechanism (pinion) 134. In the embodiment shown in the figures, the adjustment mechanism 134 is a knob that is turned clockwise and counterclockwise to effectuate the adjustment of the wings 128, though any adjustment mechanism 134 may be utilized. Importantly, when the knob 134 is rotated by a user, each rack 130 (and thus wing 128) is moved in or out, as the case may be, and is moved substantially the same distance. In embodiments, the adjustment mechanism 134 includes a locking function to prevent accidental adjustment.

The wings 128 may be dependently (i.e., simultaneously) adjustable relative to the center of the vertical portion of the tube 112 by sliding the adjustment mechanism 134 to the left or right, as desired, and locking the adjustment mechanism 134 in place (e.g., via an over center clamp or other locking mechanism). In embodiments, the entire thigh restraint 116 may be rotatable relative to the vertical portion of the tube 112, i.e., in towards the inner thigh or away from the body, and locked in the desired rotated position. Accordingly, the thigh restraint 116 may be adjustable according to the specific ergonomics of the user's leg.

In embodiments, the thigh restraint 116 is re-configurable for use with a right leg or a left leg. For example, the thigh restraint 116 may be slightly offset and/or angled to provide a more comfortable fit for the user as described immediately above. Accordingly, in a first configuration, the thigh restraint 116 is for use with a right leg, and in a second configuration is for use with a left leg. To accommodate the configurations, the thigh restraint 116 may be removably coupled to the vertical portion of the tube 112 in a first orientation and a second flipped orientation, and is thus usable by either a right or left leg.

The thigh strap 118 may extend entirely around the user's thigh from a first wing 128 to a second wing 128. In embodiments, the strap 118 is permanently or semi-permanently affixed to one of the wings 128 and is temporarily secured to the other wing 128 (e.g., via magnets, hook-and-loop fastener, an over-center locking mechanism, or any other kind of fastening mechanism). The length of the strap 118 may be adjustable to further accommodate various thigh circumferences.

The strap 118 may be made of any material. In embodiments, it may be preferable for at least a portion of the strap 118 to include a breathable material, such as a mesh.

The adjustment mechanism 134 may dually function as a handle. In an embodiment, the knee crutch 100 may further include a separate handle that the user may hold onto as needed or desired during use.

One or more attachment components 140 allow the platform portion 110 to attach to the adjustable leg tube 104. In embodiments, the attachment component(s) 140 may allow adjustable leg tube 104 to slide forwards and/or backwards along the platform portion 110 such that the user can selectively choose the most comfortable and natural support point, be it closer to the user's knee or closer to the ankle. This may also accommodate varying lengths of the cradle 114 in embodiments where the length of the cradle 114 is selectively adjustable as described above. Where the support tube platform 110 is fixed to the adjustable leg tube 104, the adjustable leg tube 104 may preferably, but not necessarily, extend generally under the knee of the user as shown in the figures.

Figure 3:
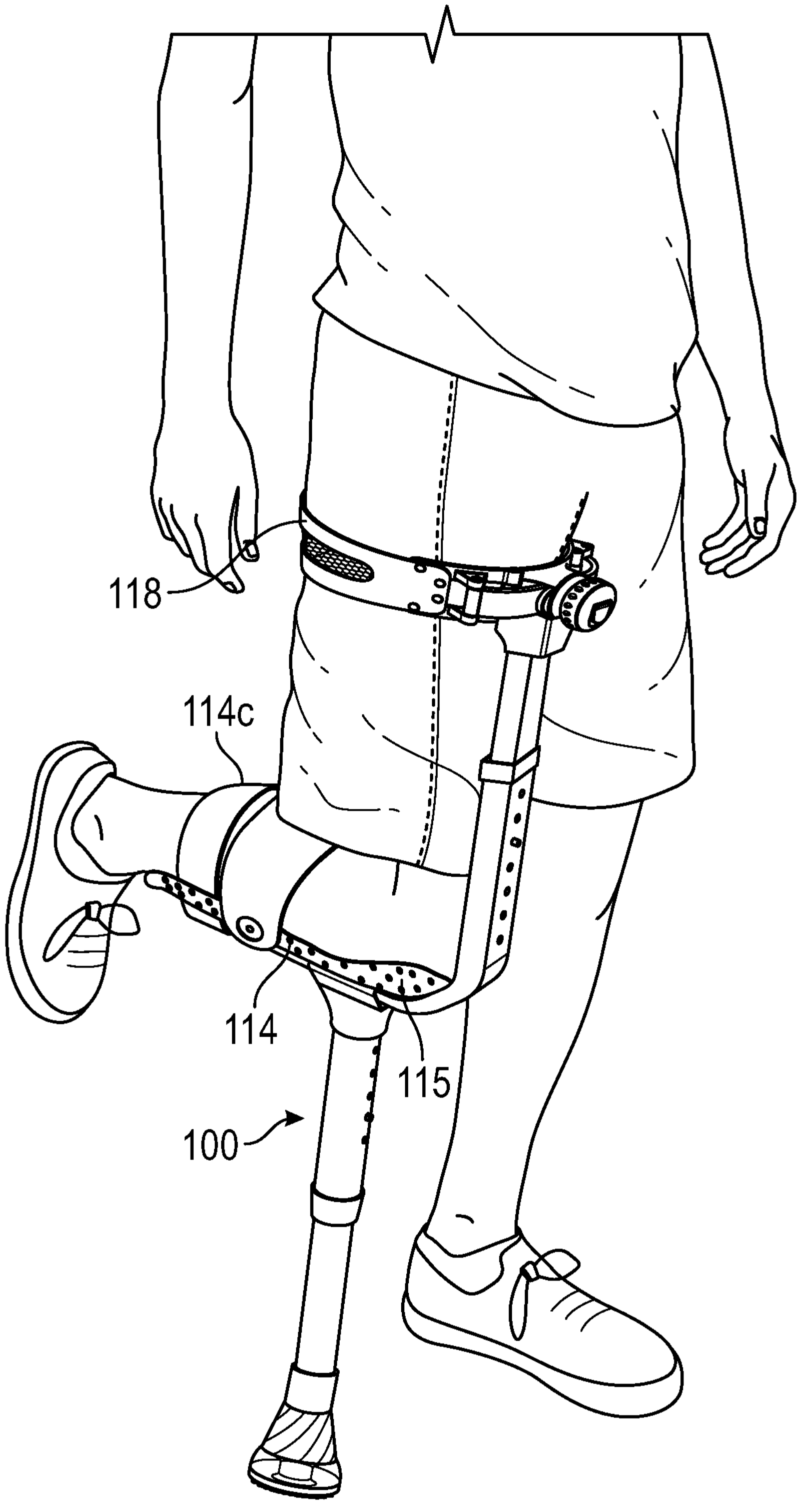
FIG. 3 is a perspective view of the knee crutch of FIGS. 1A and 1B in use.
Figure 4:
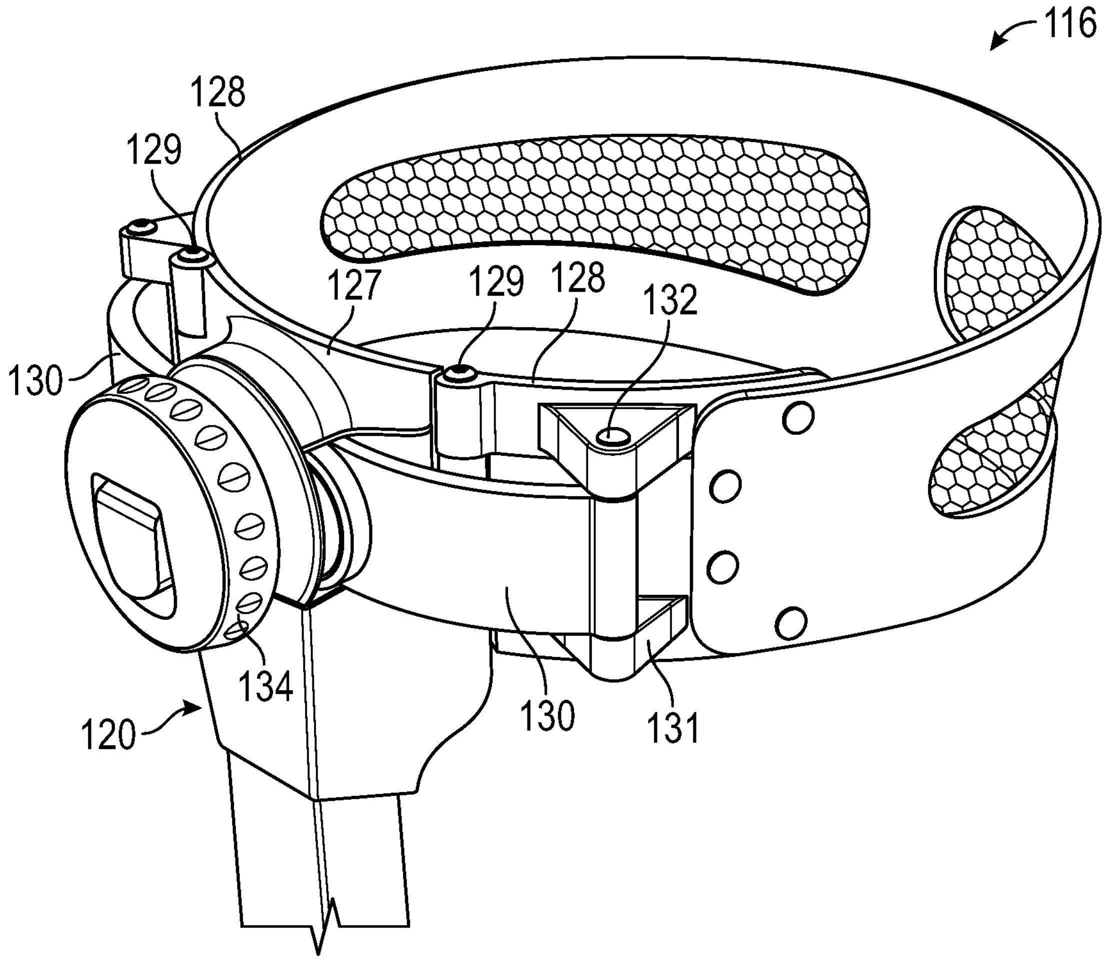
FIG. 4 is an enlarged view of an adjustable thigh strap of the knee crutch of FIGS. 1A and 1B.

FIG. 3 shows a knee crutch 100 in use. The user's shin rests in the shin support 114 and the user's knee is generally within the cup region 115 of the shin support 114. The straps 114*c* extend over the user's calf to keep the shin within the shin support 114. The thigh restraint 116, and specifically the thigh strap 118, is secured around the user's thigh to keep the crutch 100 secured to the user's leg.

Many different arrangements of the various components depicted, as well as the components not shown, are possible without departing from the spirit and scope of the invention. Embodiments of the invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the invention. Further, it will be understood that certain features and subcombinations are of utility and may be employed within the scope of the disclosure. Further, various steps set forth herein may be carried out in orders that differ from those set forth herein without departing from the scope of the claimed methods. The specification shall not be restricted to the above embodiments. Any units of measurement provided herein are exemplary only and not meant to specifically define the dimensions of the system. Other dimensions may be appropriate or desirable.

The invention claimed is:

1. A knee crutch, comprising:
a leg tube;
a support tube secured to the leg tube and comprising a platform portion and a vertical portion;
a cradle positioned atop and secured to the platform portion of the support tube; and
a thigh restraint coupled to the vertical portion of the support tube, the thigh restraint comprising a pair of wings operably coupled to an adjustment mechanism, wherein the adjustment mechanism is configured to simultaneously and dependently adjust an angular position of the pair of wings.

2. The knee crutch of claim 1, wherein the cradle comprises a knee end and an ankle end, the knee end having a cupped configuration for receiving a user's knee, and the ankle end having a rolled edge that is rolled downwardly away.

3. The knee crutch of claim 1, wherein the cradle is selectively partially covered with a cover selected from the list consisting of an air bladder and a foam pad.

4. The knee crutch of claim 1, wherein the cradle comprises a plurality of openings defined therein.

5. The knee crutch of claim 1, wherein the cradle comprises a strap extending at least partially over a width of the cradle, a first end of the strap being attached to one side of the cradle and a second end of the strap being detached from another side of the cradle.

6. The knee crutch of claim 1, wherein each wing of the pair of wings comprises an extension member extending between the respective wing and the adjustment mechanism, each respective extension member being rotatably coupled to the respective wing at a first end thereof and in operable communication with the adjustment mechanism at a second end thereof, wherein actuating the adjustment mechanism in a first direction causes the wings to simultaneously and dependently move toward one another and actuating the adjustment mechanism in a second direction causes the wings to simultaneously and dependently move away from one another.

7. The knee crutch of claim 1, wherein the thigh restraint further comprises a strap extending between the respective wings.

8. The knee crutch of claim 7, wherein the strap is removably fastened to at least one of the respective wings.

9. The knee crutch of claim 1, wherein the thigh restraint is selectively removable from the vertical portion of the support tube and is reattachable to the vertical portion of the support tube in a flipped configuration, wherein, in the flipped configuration, the crutch is configured for specific use with a user's right leg or a user's left leg.

10. A knee crutch, comprising:

a frame, comprising:

a leg tube comprising a foot; and a support tube coupled to the leg tube, the support tube comprising a generally horizontal platform portion and a generally vertical portion;

a cradle positioned atop and secured to the platform portion of the support tube substantially along a length of the platform portion; and a thigh restraint coupled to the vertical portion of the support tube, the thigh restraint comprising:

a brace;

an adjustment mechanism coupled to the brace;

a first wing comprising a first end and a second end, the first end being rotatably coupled to the brace, the first wing further comprising a first extension member comprising a proximal and a distal end, the proximal end of the first extension member being rotatably coupled to the first wing via a bracket, and the distal end of the first extension member being in operable communication with the adjustment mechanism;

a second wing comprising a first end and a second end, the first end of the second wing being rotatably coupled to the brace, the second wing further comprising a second extension member comprising a proximal and a distal end, the proximal end of the second extension member being rotatably coupled to the second wing via a bracket, the distal end of the second extension member being in operable communication with the adjustment mechanism; and a strap extending between the respective second ends of the first and second wings, the strap being secured to one of the respective second ends of the first and second wings and selectively temporarily coupled to the other of the respective second ends of the first and second wings;

wherein actuating the adjustment mechanism simultaneously and dependently adjusts an angular position each of the first and second wings.

11. The knee crutch of claim 10, wherein a height of the leg tube is selectively adjustable.

12. The knee crutch of claim 11, wherein a height of the generally vertical portion of the support tube is selectively adjustable.

13. The knee crutch of claim 10, wherein the cradle comprises a strap fixed to one side of the cradle and extending at least partially over a width thereof.

14. The knee crutch of claim 10, wherein the cradle comprises a cover.

15. The knee crutch of claim 14, wherein the cover is an air bladder or a foam pad.

16. The knee crutch of claim 10, wherein the adjustment mechanism and the respective first and second extension members together form a lockable rack-and-pinion.

17. A knee crutch, comprising:

a frame;

a cradle supported by the frame; and a thigh restraint coupled to frame, the thigh restraint comprising a pair of wings operably coupled to an adjustment mechanism;

wherein actuating the adjustment mechanism in a first direction causes the wings to simultaneously and dependently move toward one another, and actuating the adjustment mechanism in a second direction causes the wings to simultaneously and dependently move away from one another.

18. The knee crutch of claim 17, wherein:

the thigh restraint is configured for specific use with one of a right leg or a left leg in a first configuration and the other of the right leg or the left leg in a flipped second configuration; and the thigh restraint is selectively removable and reattachable to the frame to switch between the first and second configurations.

19. The knee crutch of claim 17, wherein the cradle comprises a strap having one end secured to a long side of the cradle and an unsecured end, the strap extending at least partially over a width of the cradle.

20. The knee crutch of claim 17, wherein the thigh restraint further comprises a thigh strap extending between the pair of wings, a first end of the thigh strap being affixed to one of the wings of the pair of wings and a second end of the thigh strap being temporarily coupled to the other of the wings of the pair of wings in a use configuration.

* * * * *